2,840,492
BOX TOE MATERIALS

Cherry L. Emerson, Jr., Newton, Mass., assignor to Beckwith-Arden Inc., a corporation of New Hampshire No Drawing. Application May 27, 1953
Serial No. 357,915

4 Claims. (Cl. 117—140)

Box toe stiffeners produced in accordance with conventional practices usually comprises a fibrous base impregnated with a thermoplastic composition composed of a mixture of natural resinous materials or certain synthetic resins such as cellulose esters, ethers, etc., which may be softened by the application of suitable solvents, or mild heat. In accordance with the general practice the shoe upper, doubler and liner are sewn together and the assemblage applied to a last, after which the softened box toe blank is inserted between the liner and doubler. It is not only essential that the box toe blank remain pliable at least throughout the bed lasting operation, but also that it firmly adheres to the doubler and lining so that by the time the shoe is removed from the last the liner, box toe blank and doubler are integrated into a relatively rigid structure having a high resistance to impact.

Thermoplastics of the aforementioned type are subject to certain disadvantages in that they either fail to fulfill the above requirements, or they are too expensive, inflammable, difficult to use because of the relatively high temperature required to effect the desired degree of pliability, rapid loss of solvent with consequent loss of pliability, or lack of moldability.

The principal objects of the present invention are to overcome the aforementioned disadvantages and to provide a box toe material which may be readily softened either by the application of heat or by selected solvents, which is capable of adhesively integrating the doubler and liner to provide a structure having an outstanding impact resistance, and which is free from components that undergo bacterial decomposition.

Further objects will be apparent from a consideration of the following disclosure which sets forth examples illustrative of what is now considered the preferred procedures.

I have discovered that if a fibrous base is impregnated with a mixture of a styrene-butadiene copolymer and a styrene polymer, wherein the ratio of total styrene to butadiene is between 75:25 and 95:5, the resulting physical properties of the box toe material, particularly the adhesion and impact resistance, are generally superior to those produced by a copolymer having the same styrene-butadiene ratio. In other words, a copolymer having a styrene-butadiene ratio between 75:25 and 95:5 produces an unsatisfactory box toe material, whereas a mixture of the copolymer and polystyrene having the same total styrene to butadiene ratio produces a highly satisfactory material.

In accordance with the present invention a fibrous base, such as a woven, knitted or felted textile material, is impregnated with a resinous composition consisting essentially of a mixture of styrene-butadiene copolymer and a styrene polymer, wherein the ratio of total styrene to butadiene being not less than approximately 75:25 and not exceeding approximately 95:5, the preferred range being between 80:20 and 90:10. The impregnating step may be carried out in conventional manner and under such conditions that the fibrous base picks up from approximately 300% to 500% or more of its weight of the resinous composition (dry basis), thereby to produce a substantially continuous coating or surface of the resinous material.

The impregnating or treating composition is preferably a mixture of the aqueous dispersions of the copolymer and styrene polymer containing a suitable thickening agent which does not undergo bacterial decomposition and which is preferably relatively water-resistant when dried out. To this end high molecular weight polymers having free acid groups are advantageously employed since they may be dispersed in dilute ammonium hydroxide and other water-soluble volatile amines. Illustrative of this class of materials are the heteropolymers comprising the reaction product of styrene or the like vinyl compounds and such organic acids and anhydrides as acrylic, maleic, crotonic, methacrylic, citraconic, itaconic, etc., and the esters of these acids. These materials are commercially available under such trade designations as Stymer Resin (a styrene-maleic anhydride-methyl maleate reaction product), Merlon WS-15 (the ammonium salt of the above), Lustrex–820 (a styrene-secondary butyl maleate-methyl maleate reaction product), and Polymerc–3 (a vinyl-crotonic acid reaction product), all of which are dispersible in dilute ammonium hydroxide to produce a viscous fluid and on drying are water-insoluble. A further advantage of these heteropolymers is that when dried out they are not only soluble or swellable in the aromatic solvents used to soften the box toe material and develop the desired tackiness, but also do not adversely affect the adhesion as do the conventional hydrophilic materials.

If desired, moderate amounts of finely divided fillers and other compounding materials may be incorporated in the treating composition, provided they do not adversely affect adhesion and other desired properties.

After impregnation or treatment the material may be dried out in any suitable manner, and to this end conventional oven drying or drying on textile cans at a temperature of approximately 250° F. is recommended, or if desired infra red radiations may be advantageously employed. After impregnation and drying the material is in the form of a relatively stiff sheet having a substantially continuous coating of resinous composition and it may be cut into "blanks" of the desired sizes and packed for shipment or storage.

In use blanks of the proper size are softened by wetting with a suitable solvent or solvent mixture, such as benzol, toluol, xylol, styrene, etc., or their mixtures, which may contain up to 5% of dissolved solid polymers of styrene and/or styrene-butadiene. The immersion time, usually about ten seconds, must be sufficient to render the material soft and pliable so that it can readily be moulded to the contour of the last. When the excess solvent is drained from the blank, a considerable amount of surface tack develops and at this point the prepared blank may be inserted in pliable condition between the doubler and liner preparatory to starting the lasting.

Upon evaporation of the solvent the material reverts to its original stiffness and provides a strong bond which integrates the doubler and liner into a rigid structure having a high degree of impact resistance.

Since the period from the time the blanks are wet with the solvent and the completion of the bed lasting operation may vary according to factory conditions, and as the prepared blank should remain pliable during this period, the solvent or solvent mixture to be used should be selected so as not only to insure the desired pliability during the aforesaid period, but also substantially complete evaporation of the solvent by the time the shoe is removed from the last.

Illustrative procedures for preparing a box toe material in accordance with the present invention are as follows:

*Example 1.*—An aqueous dispersion of a 81.5 parts of a 60–40 styrene-butadiene copolymer (Kralac–2711) is mixed with 144 parts an aqueous dispersion of polystyrene (Lustrex–601) to produce a latex mixture having a total solids content of about 44% and a total styrene to butadiene ratio of about 83/17. A 28% ammonium hydroxide solution is then added in an amount sufficient to produce a pH of 10 to 11, followed by gentle heating to a temperature between 120° and 150° F., after which 1% thickening agent (Lustrex–820), based on the weight of resin, is added and the mixture is stirred until a uniform dispersion is produced. The mixture is then cooled to room temperature (70°–90° F.) and then run into the impregnating apparatus.

A double nap flannel, 4½ ounce—300 double nap, is then run through the treating composition, passed through squeeze rolls or between doctor blades to remove the excess, and dried at a temperature of 180° to 250° F., the pick-up of latex solids being 430% of the fabric base.

*Example 2.*—The same procedure as set forth in Example 1 was followed, except that 123 parts of the styrene-butadiene copolymer, 217 parts of the polystyrene and 0.67% of the thickening agent were used to produce—a 44% dispersion having a total styrene to butadiene ratio of 83:17, and the pick-up of latex solids was 375% of the fabric base.

*Example 3.*—The same procedure as set forth in Example 1 was followed, except that 94 parts of the styrene-butadiene copolymer, 255 parts of the polystyrene and 0.67% of the thickener were used to produce a 43% dispersion having a total styrene to butadiene ratio of 87:13 and the pick-up of latex solid was 375% of the fabric base.

*Example 4.*—The same procedure as set forth in Example 1 was followed except that 72 parts of the styrene-butadiene copolymer, 283 parts of polystyrene and 0.67% of the thickener were used to produce a 42% dispersion having a total styrene to butadiene ratio of 90:10, and the pick-up of latex solids was 435% of the fabric base.

*Example 5.*—For the purpose of comparison a box toe was prepared from the same fabric base as set forth in Example 1 using 350 parts of a copolymer of 83% styrene and 17% butadiene, and 0.67% of the thickener to produce a 45% dispersion. The pick-up was 405% of the fabric base.

Box toe blanks, prepared from the materials of each of the foregoing examples, were incorporated in lasted shoe uppers in the manner previously described and the resulting structures were subject to comparative tests to evaluate adhesion and rigidity. The results are shown in the following tabulation:

| Material of Example | Styrene-Butadiene Ratio | Percent Solids Pick-Up | Adhesion of Box Toe | Rigidity of Box Toe |
|---|---|---|---|---|
| No. 1 | 83:17 | 430 | Good | Good. |
| No. 2 | 83:17 | 375 | do | Do. |
| No. 3 | 87:13 | 375 | Good+ | Excellent. |
| No. 4 | 90:10 | 435 | Excellent | Good +. |
| No. 5 | 83:17 | 405 | Fair | Poor. |

*Example 6.*—An aqueous dispersion of a 72.4 parts of a 50–50 styrene-butadiene copolymer (Lotol 5321) is mixed with 165 parts of an aqueous dispersion of polystyrene (Lustrex 601) to produce a latex mixture having a total content of 42.2% and a styrene to butadiene ratio of 83:17. A 28% ammonium hydroxide solution is then added in an amount sufficient to produce a pH of 10–11, followed by gentle heating to a temperature between 120° and 150° F., after which 3% thickening agent (Lustrex 820), based on the weight of resin, is added to the mixture and is stirred until a uniform dispersion is produced. The mixture is then cooled to room temperature and run into the impregnating apparatus.

A double nap flannel, 4½ ounces—300 double nap, is then run through the treating composition, passed through squeeze rolls or between doctor blades to remove the excess, and dried at a temperature of 180° F. to 250° F., the pick-up of latex solids being 400% of the fabric base.

| | | | | |
|---|---|---|---|---|
| No. 6 | 83:17 | 400 | Poor | Fair. |

Comparison of Example No. 1 made from a 60–40 styrene-butadiene copolymer (Kralac 2711), with Example No. 6 made from a 50–50 styrene-butadiene copolymer (Lotol 5321) and otherwise being essentially identical in both composition and preparation, makes it clear that the 60–40 copolymer is a superior base for the preparation of my impregnant. I therefore, prefer to use the 60–40 copolymer rather than the 50–50 copolymer in combination with Lustrex 601 to prepare the final impregnant.

It clearly appears in addition from the foregoing that a mixture of the styrene-butadiene copolymer and polystyrene, within the specified limits, imparts physical properties which are not possessed by the copolymer having the same styrene-butadiene ratio.

It is to be understood that this disclosure is for the purpose of illustration and that various changes and modifications in the aforementioned procedure and formulations may be made within the specified limits, without departing from the spirit and scope of the invention as set forth in the following claims.

I claim:

1. A box toe blank comprising a fibrous base impregnated and stiffened with a resinous composition consisting essentially of a mixture of polystyrene and a styrene-butadiene copolymer having a styrene content in excess of 50% by weight based on the total weight of copolymer, wherein the ratio of total styrene to butadiene is not less than 75:25 and not more than 95:5, the ratio of said resinous compositions to said fibrous base on a dry basis being at least approximately 3:1, whereby the blank may be temporarily softened and made adhesive by the application thereto of solvent.

2. The box toe blank defined by claim 1 wherein the ratio of styrene to butadiene is between 80:20 and 90:10.

3. A box toe blank comprising a fibrous base impregnated and stiffened with a resinous composition consisting essentially of a mixture of polystyrene, a styrene-butadiene copolymer having at least 50% styrene, and a thickening agent comprising a heteropolymer of styrene and an unsaturated organic acid, wherein the ratio of total styrene to butadiene is not less than 75:25 nor more than 95:5, the ratio of said resinous composition to said fibrous base on a dry basis being at least approximately 3:1.

4. The box toe blank defined by claim 3 wherein the ratio of styrene to butadiene is between 80:20 and 90:10.

References Cited in the file of this patent

UNITED STATES PATENTS

| | | |
|---|---|---|
| 2,130,794 | Enos | Sept. 20, 1938 |
| 2,277,941 | Almy | Mar. 31, 1942 |
| 2,574,439 | Seymour | Nov. 6, 1951 |
| 2,637,095 | Mersereau | May 5, 1953 |